(12) United States Patent
Joffre (10) Patent No.: US 9,359,080 B2
(45) Date of Patent: Jun. 7, 2016

(54) AIRCRAFT BENCH COMPRISING BUCKET SEATS INDIVIDUALLY MOUNTED TO TILT DOWNWARDS AND AT THE REAR OF THE BENCH IN THE EVENT OF THE AIRCRAFT BEING SUBJECTED TO A HIGH LEVEL OF DECELERATION

(71) Applicant: AIRBUS HELICOPTERS, Marignane (FR)

(72) Inventor: Jean-Francois Joffre, Martigues (FR)

(73) Assignee: Airbus Helicopters, Marignane (FR)

( * ) Notice: Subject to any disclaimer, the term of this patent is extended or adjusted under 35 U.S.C. 154(b) by 0 days.

(21) Appl. No.: 14/601,533

(22) Filed: Jan. 21, 2015

(65) Prior Publication Data
US 2015/0210394 A1 Jul. 30, 2015

(30) Foreign Application Priority Data
Jan. 24, 2014 (FR) ...................................... 14 00157

(51) Int. Cl.
*B60N 2/42* (2006.01)
*B64D 11/06* (2006.01)

(52) U.S. Cl.
CPC ........ *B64D 11/0619* (2014.12); *B64D 11/0648* (2014.12)

(58) Field of Classification Search
CPC ........................ B64D 11/0619; B64D 11/0648
USPC ............................ 297/216.1, 216.19, 216.13
See application file for complete search history.

(56) References Cited

U.S. PATENT DOCUMENTS

| | | | | | |
|---|---|---|---|---|---|
| 3,460,791 | A | * | 8/1969 | Judd | B64D 25/04 248/188.91 |
| 3,724,603 | A | * | 4/1973 | Shiomi | B60N 2/4228 188/371 |
| 3,957,304 | A | * | 5/1976 | Koutsky | B60N 2/4249 248/393 |
| 4,440,441 | A | * | 4/1984 | Marrujo | B60N 2/4221 188/371 |
| 4,487,383 | A | | 12/1984 | Mazelsky | |
| 4,718,719 | A | * | 1/1988 | Brennan | B64D 11/06 244/122 R |

(Continued)

FOREIGN PATENT DOCUMENTS

| | | |
|---|---|---|
| CN | 101492095 | 7/2009 |
| DE | 4312343 | 10/1994 |

(Continued)

OTHER PUBLICATIONS

French Search Report for FR 1400157, Completed by the French Patent Office on Oct. 16, 2014, 9 Pages.

*Primary Examiner* — Jose V Chen
(74) *Attorney, Agent, or Firm* — Brooks Kushman P.C.

(57) ABSTRACT

An aircraft bench comprising a support structure having hinged thereto one or more frameworks for mounting at least one bucket. The framework(s) is/are hinged at the front of the bench to a pair of longitudinally-extending bars of the support structure arranged spaced apart in vertical superposition. The framework(s) is/are carried in suspension by the support structure by being held against tilting individually downwards and at the rear of the bench by at least one energy absorber interposed between the support structure and a framework with which it is associated. Deformation of the energy absorber, as caused by the aircraft crashing and/or being subjected to a high level of deceleration, allows the frameworks to tilt individually downwards and at the rear of the bench in order to protect the passengers installed in the bucket(s).

23 Claims, 5 Drawing Sheets

(56) References Cited

U.S. PATENT DOCUMENTS

| | | | | |
|---|---|---|---|---|
| 4,911,381 A * | 3/1990 | Cannon | B64D 25/04 | 244/122 R |
| 5,069,505 A * | 12/1991 | Amthor | B64D 11/06 | 297/216.2 |
| 5,224,755 A * | 7/1993 | Beroth | B60N 2/242 | 297/216.1 |
| 5,338,090 A * | 8/1994 | Simpson | B60N 2/4221 | 297/216.2 |
| 5,657,950 A | 8/1997 | Han et al. | | |
| 5,730,492 A * | 3/1998 | Warrick | B60N 2/4221 | 297/216.2 |
| 6,334,643 B1 * | 1/2002 | Lindblad | B60N 2/4228 | 296/65.09 |
| 6,565,151 B2 * | 5/2003 | Jarnail | B60N 2/4221 | 244/122 R |
| 6,669,143 B1 | 12/2003 | Johnson | | |
| 6,786,543 B2 * | 9/2004 | Andersson | B60N 2/20 | 296/65.09 |
| 7,607,729 B1 * | 10/2009 | Udriste | B60N 2/43 | 297/216.1 |
| 8,146,988 B2 * | 4/2012 | Mowry | B60N 2/24 | 297/216.1 |
| 8,303,034 B2 * | 11/2012 | Gross | B60N 2/42736 | 296/68.1 |
| 8,408,643 B2 | 4/2013 | Honnorat | | |
| 8,882,194 B2 * | 11/2014 | Marini | B64D 25/04 | 297/216.13 |
| 8,882,195 B2 * | 11/2014 | Kaessner | B60N 2/42709 | 297/216.19 |
| 9,132,754 B2 * | 9/2015 | Mindel | B60N 2/2824 | |
| 2002/0024242 A1 * | 2/2002 | Becker | B60N 2/0276 | 297/216.1 |
| 2003/0052519 A1 * | 3/2003 | Reynolds | B60N 2/42763 | 297/216.1 |
| 2008/0197684 A1 * | 8/2008 | Ott | B60N 2/501 | 297/344.16 |
| 2009/0134595 A1 * | 5/2009 | Haller | B60G 17/0155 | 280/124.157 |
| 2009/0309397 A1 * | 12/2009 | Gross | B60N 2/4221 | 297/216.1 |
| 2011/0074189 A1 * | 3/2011 | Sawada | B60N 2/20 | 297/216.1 |
| 2012/0074743 A1 * | 3/2012 | Asakura | B60N 2/1615 | 297/216.1 |
| 2013/0119721 A1 * | 5/2013 | Suzuki | B60N 2/4235 | 297/216.1 |

FOREIGN PATENT DOCUMENTS

| | | |
|---|---|---|
| EP | 0423348 | 4/1991 |
| FR | 2683191 | 5/1993 |
| FR | 2950607 | 4/2011 |
| WO | 9219464 | 11/1992 |
| WO | 2012053618 | 4/2012 |

* cited by examiner fig.1 fig.2 fig.5 fig.6 fig.7 fig.8 fig.9 fig.10 fig.11 fig.12 fig.13

AIRCRAFT BENCH COMPRISING BUCKET SEATS INDIVIDUALLY MOUNTED TO TILT DOWNWARDS AND AT THE REAR OF THE BENCH IN THE EVENT OF THE AIRCRAFT BEING SUBJECTED TO A HIGH LEVEL OF DECELERATION

CROSS REFERENCE TO RELATED APPLICATION

This application claims priority to French patent application No. FR 14 00157 filed on Jan. 24, 2014, the disclosure of which is incorporated in its entirety by reference herein.

BACKGROUND OF THE INVENTION (1) Field of the Invention

The present invention relates to the field of seats for aircraft, and in particular rotorcraft. The present invention relates more particularly to the structural organization of a bench providing safety for passengers in the event of the aircraft being subjected to a high level of deceleration and/or in the event of a crash, by providing protection against the deformation of at least one wall of the aircraft on which the bench is fastened.

(2) Description of Related Art

It should be understood below that the concept of "longitudinal" and the associated concept "longitudinally-extending bar", the concept of "transverse", and the associated concept of "transverse-member", and the concepts of "vertical", "horizontal", "front", "rear", "base", "low", and "high", for example, are concepts that are relative and identified with respect to the dimensions in which the bench under consideration extends in a situation of use by a passenger conventionally installed on the bench.

Seats for aircraft incorporate means for protecting passengers installed on those seats in the event of the aircraft crashing. More particularly, an aircraft seat is commonly organized to compensate for the deformation of a wall of the aircraft on which the seat is fastened and/or for absorbing the energy that results from the forces to which the seat carrying the passenger is generally subjected in the event of the aircraft suffering a high level of deceleration.

For this purpose, an aircraft seat is conventionally arranged as a structure that is deformable at a predetermined threshold for the force to which the seat is subjected, and/or that is fitted with energy absorber means suitable for compensating the stresses to which the seat is subjected when suffering violent impacts and/or in the event of the aircraft being subjected to a high level of deceleration.

Aircraft seats include benches organized as a support structure carrying a framework on which bucket seats or "buckets" are fastened. An advantage of such benches is to enable a plurality of buckets to be installed on board the aircraft while using a common support structure of weight and size that are small compared with installing seats individually, each having a single bucket.

The support structure is fitted with anchor members for anchoring to at least one wall of the aircraft, the anchor members together defining an installation plane for the bench on board the aircraft. The support structure commonly includes a pair of longitudinally-extending bars that extend in the long direction of the bench, said bars carrying the framework and together defining a bucket support plane that extends substantially parallel to the plane on which the bench is installed.

The wall of the aircraft on which the support structure is anchored is commonly formed by a floor having the support structure fastened thereto via at least one underframe having means for fastening it to the floor on its base. By way of example, the underframe is fastened to the floor by bolts or via fittings that co-operate with rails incorporated in the floor.

The wall of the aircraft on which the support structure is anchored may also potentially be formed by a structural wall of the fuselage of the aircraft to which the support structure is fastened at at least one of its longitudinal ends.

For example, the support structure may be provided at one of its longitudinal ends with first fastener means for fastening to a structural wall of the aircraft fuselage and at its other longitudinal end with an underframe having second fastener means for fastening to the floor of the aircraft.

Each bucket is dedicated to receiving a single passenger, and conventionally each is formed by a one-piece unit comprising a seat proper with a back extending upwards therefrom, the seat and the back typically being oriented at a dihedral angle relative to each other.

The framework conventionally comprises a set of supports for buckets arranged in succession in alignment along the long direction of the bench as defined by the general direction in which the bars extend. Conventionally, the supports are carried jointly by the longitudinally-extending bars in their front portions and in their rear portions. The supports are commonly arranged as single-piece angle members, each constituted by an upright-member and by a transverse-member forming a dihedral angle between each other matching the dihedral shape of the buckets.

The buckets are fastened on two neighboring supports by being installed side by side on the framework in succession along the long direction of the bench, the seat and the back of each bucket being fastened to respective branches of each of two adjacent said angle members.

In that context, there are various difficulties that need to be overcome in order to make safe passengers who are installed on the bench in the event of the aircraft being subjected to a high level of deceleration and/or being involved in a crash, while still ensuring suitable comfort for the passengers when the seat is in ordinary use, and indeed possibly optimizing such comfort.

Such difficulties lie in the context of an on-going search for reducing the weight of a bench while also optimizing the number of buckets that can be installed on the support structure for a bench of given size.

Except in an aircraft crash situation, i.e. in a situation of ordinary use of the bench, each of the support structure and/or the framework constitutes a unit that is robust and not deformable.

In order to protect the passengers installed on the bench in the event of the aircraft crashing, it is known to hinge the framework to the support structure so as to allow the framework to move relative to the support structure when the bench is subjected to a predefined force threshold. Such hinged mounting of the framework is conventionally achieved via longitudinally-extending bars, such as by hinged mounting of the supports on the bars or of the bars on the support structure.

With a bench of such an architecture, the framework is allowed to move relative to the support structure in the event of the support structure deforming as a result of the aircraft crashing and causing the support structure to be subjected to forces greater than said force threshold due to deformation of said at least one wall of the aircraft on which the support structure is fastened.

Still for the purpose of protecting passengers in the event of the aircraft crashing, it is also known to interpose energy absorber means between various members of the bench. By way of example, such energy absorber means may be interposed between the framework and the support structure, between the buckets and the framework, or indeed between structural elements of the support structure.

Such energy absorber means are constituted in particular by means that are deformable at a predetermined threshold and they are known in the field of seats for aircraft. On this topic, reference may be made for example to the following documents: FR 2 683 191 (Israel Aircraft Ind. Ltd.), DE 4 312 343 (Eurocopter Deutschland), and FR 2 950 607 (Eurocopter France).

Concerning passenger comfort in an ordinary use situation of the bench, it is also desirable for the architecture of the bench to allow the dihedral angle formed between the seat and the back of each bucket to be modified and to allow the height position of each seat to be adjusted. Naturally, such arrangements must not interfere with the robust and non-deformable nature of the support structure and/or of the framework in the absence of the aircraft being in a crash situation.

It is also desirable in an ordinary use situation of the bench for the architecture of the bench to lead to no impediment for passengers installed on the bench concerning another bench placed in front of them. It is in particular advantageous for passengers installed on one bench to be able to stretch their legs, while still enabling two adjacent benches to be installed as close as possible one in front of the other. For this purpose, it is desirable for the space under the bench to be sufficiently unencumbered to be able to receive the lower limbs of a rear passenger.

Numerous bench architectures have been proposed in the context of the above-mentioned search for improved seats. For example, reference may be made to the following documents: EP 0 423 348 (Shigeru Kiguchi et al.), U.S. Pat. No. 5,657,950 (Ind. Technology Research Int. et al.), U.S. Pat. No. 4,718,719 (E. J. Brennan et al.), CN 101 492 095 (He Caifu et al.), WO 2012/053618 (Delta Tooling Co. Ltd.), WO 92/19464 (Koito Kogyo KK), U.S. Pat. No. 6,669,143 (Glenn Johnson), and U.S. Pat. No. 4,487,383 (Bernard Mazelsky).

BRIEF SUMMARY OF THE INVENTION

An object of the present invention is to propose an aircraft in the context of the above-mentioned search for improved seats and taking account of the various above-mentioned constraints.

The aircraft bench of the present invention comprises a support structure having hinged thereto at least one framework for mounting at least one bucket comprising a seat with a back rising therefrom to define respectively a seat plane and a back plane forming a dihedral angle relative to each other.

The bench has at least one energy absorber means that is deformable under the effect of the bench withstanding forces greater than a predefined force threshold. Said force threshold is conventionally defined as a function of an acceptable threshold for variation in the speed of the aircraft, such that the energy absorber means deform in the event of the aircraft crashing and/or being subjected to a high level of deceleration. In conventional manner, the deformation of the energy absorber means enables passengers installed on the bench to be protected, in particular by limiting the forces to which the spinal columns of the passengers are subjected.

In various configurations of the bench, the energy absorber means may potentially work in traction or in compression. Conventionally, when the energy absorber means work in traction, deformation of the energy absorber means in the event of a crash gives rise to extension thereof conversely, when the energy absorber means work in compression, deformation of the energy absorber means in the event of a crash give rises to contraction thereof.

The support structure comprises longitudinally-extending bars and is provided with anchor members suitable for fastening the bench in its in-use position on board an aircraft. The bench is conventionally installed on board the aircraft by means of anchor members lying in an installation plane extending substantially parallel to the seat plane and identified in particular by a floor of the aircraft in which the bench is fitted. More particularly, the positions of the anchor members relative to one another on the support structure determine the orientation of said installation plane.

Such anchor members are known in the field of aviation, e.g. being constituted in conventional manner by at least one underframe fitted to the support structure and provided with first fastener means for fastening to a floor of the aircraft and/or also by way of example being constituted by second fastener means fitted to the support structure at a longitudinal end thereof in order to anchor it to a structural wall of the fuselage of the aircraft.

The framework includes at least one upright-member for holding the back and at least one top transverse-member for holding the seat. The top transverse-member engages the upright-member and is hinged to the support structure via one of said longitudinally-extending bars referred to as the top bar. Said top bar extends in the high portion at the front of the support structure.

The bench of the present invention is mainly recognizable in that the bench comprises the provisions described below:

Another of said longitudinally-extending bars of the support structure, referred to as the bottom bar, extends in the low portion at the front of the support structure under the seat plane. The bottom bar and the top bar are arranged spaced apart substantially in vertical superposition. In addition, said at least one upright-member includes an extension extending towards the base of the support structure below the seat plane from a hinged connection between the top transverse-member and the upright-member.

The framework also has at least one bottom transverse-member extending below the seat plane. The bottom transverse-member is pivotally hinged firstly to the extension of the upright-member and secondly to the support structure via the bottom bar. These provisions are such that the assembly formed in a transverse plane by the top transverse-member, the extension of the upright-member, the bottom transverse-member, and the support structure, when considered between the bars, is arranged as a deformable quadrilateral.

Furthermore, the energy absorber means are interposed with secure connections between the support structure and the framework. The energy absorber means retain the framework against tilting downwards and at the rear of the bench. Deformation of the energy absorber means allows said deformable quadrilateral to deform, thereby causing the framework to tilt and consequently causing the bucket to tilt downwards and at the rear of the bench, by the top transverse-member and the bottom transverse-member pivoting relative to the support structure and to the upright-member.

The pivoting of the bucket downwards and at the rear of the bench protects the passenger(s) installed on the bench in the event of the aircraft being subjected to a high level of deceleration. More particularly, a high level of deceleration of the aircraft causes the energy absorber means to operate and deform when the bucket is subjected to high levels of force, thereby causing said deformable quadrilateral to deform and leading to the framework tilting downwards and at the rear of the bench.

In an embodiment in which the energy absorber means work in traction, the energy absorber means are more particularly interposed between the top bar and the bottom transverse-member, retaining the framework in suspension via the bottom transverse-member.

In another embodiment in which the energy absorber means work in compression, the energy absorber means are more particularly interposed between the bottom bar and the top transverse-member, retaining the framework by supporting it via the top transverse-member.

The architecture of the bench advantageously makes it possible to install a plurality of buckets on the support structure independently of one another.

Such provisions make it possible to improve the individual comfort of passengers installed collectively on the bench, and in the event of the aircraft crashing and/or being subjected to a high level of deceleration, serve to cause the buckets to tilt individually depending on the mass of each of the respective passengers installed in the various buckets.

More particularly, in an advantageous embodiment, the bench is fitted with a plurality of frameworks that are arranged longitudinally side by side and that are individually supported in suspension by the support structure. Each of said plurality of frameworks carrying an individual bucket and each is retained against individually tilting by respective energy absorber means allocated thereto.

In an embodiment, said at least one framework comprises:

at least two said upright-members securely connected to each other by at least one longitudinally-extending top-piece. Such a top-piece serves in particular to connect together the two upright-members at their top ends so that the two upright-members and the top-piece interconnecting the upright-members together form a rigid structural assembly arranged as an arch;

at least two said top transverse-members jointly hinged on the top bar and individually engaging respective upright-members; and at least two said bottom transverse-members jointly hinged to the bottom bar and individually hinged to the bases of the extensions of respective upright-members.

In this embodiment, said at least one framework may potentially be fitted with single energy absorber means. With single energy absorber means working in traction, the single energy absorber means are potentially securely engaged with any one of the bottom transverse-members. With single energy absorber means working in compression, the single energy absorber means are potentially securely engaged with any one of the top transverse-members.

In a variant, said at least one framework is fitted with at least two energy absorber means. With energy absorber means working in traction, said energy absorber means are securely engaged with respective bottom transverse-members. With energy absorber means working in compression, said energy absorber means are securely engaged with respective top transverse-members.

In another embodiment, said at least one framework comprises:

a single said upright-member engaged with at least two said top transverse-members having respective hinges with the top bar that are longitudinally spaced apart from each other; and a single said bottom transverse-member having first ties for taking up the forces to which it is subjected. The first ties, arranged as cords, for example, connect together the bottom transverse-member and the bottom bar to which bottom bar the first ties are each engaged at positions that are longitudinally spaced apart.

In an embodiment, said anchor members comprise at least two underframes extending transversely and longitudinally connected together by the longitudinally-extending bars.

Each underframe preferably has at least one front leg and at least one rear leg, each leg being fitted at its base with fastener means suitable for fastening the bench in its in-use position to a floor of the aircraft.

Preferably, for each of the underframes, the rear leg is fastened to a high end of the front leg and extends transversely between the front leg and the rear of the bench following a curve towards the bottom of the bench with the concave side of the curve facing towards the top of the bench in its in-use position.

The curving of the rear leg makes it possible to leave clear the space needed for the framework to tilt downwards in the event of the aircraft crashing and to limit the stresses supported by the support structure and by the floor of the aircraft on which the bench is installed under the effect of the forces generated by the aircraft decelerating.

In an embodiment, the support structure is potentially fitted with second ties for taking up the forces to which it is subjected. Said second ties, e.g. arranged as a cable, connecting together each of the longitudinally-extending bars and the bases of the rear legs of each of the underframes.

Furthermore, the architecture of the bench makes it easy for it to be arranged so as to improve user comfort, in particular in the event of the plurality of buckets being carried individually by the support structure by means of respective frameworks. Such improvements in comfort relate in particular to the possibility of adjusting the height position of the bucket(s) and/or of adjusting the inclination of the back relative to the seat of a given bucket.

More particularly, said at least one framework is provided with first means dedicated to adjusting the angle formed between the seat plane and the installation plane so as to adjust the height of the bucket. Such adjustment is performed firstly by pivoting the framework about the hinge between the top transverse-member and the top bar and secondly by preventing said pivoting of the framework by first locking means when the framework is at a desired angle of inclination relative to the installation plane.

Said first means may advantageously be formed by means for adjusting the extent to which the energy absorber means extend, either between the top bar and the bottom transverse-member when the energy absorber means work in traction, or else between the bottom bar and the top transverse-member when the energy absorber means work in compression.

These provisions are such that variation in said extension of the energy absorber means leads to variation in the height position of the upright-member with the effect of varying the angle formed between the top transverse-member and the installation plane.

Still more particularly, said at least one framework is provided with second means dedicated to adjusting the dihedral angle formed between the seat plane and the back plane. Such an adjustment is performed by relative pivoting between the upright-member and the top transverse-member, and then by blocking said relative pivoting by second locking means when the seat and the back are at a desired mutual orientation.

Said second means may advantageously be formed by adjusting the extent to which the top transverse-member extends between the top bar and the upright-member, when said at least one energy absorber means works in traction, being interposed between the top bar and the bottom transverse-member.

Said second means may also advantageously be formed by adjusting the extent to which the bottom transverse-member extends between the bottom bar and the extension of the upright-member, when said at least one energy absorber means works in compression, being interposed between the bottom bar and the top transverse-member.

The height position of the bucket(s) and/or the angle of inclination of the back relative to the seat of a given bucket are preferably adjusted by the user of the bucket, in particular when the bench is fitted with a plurality of frameworks individually carrying buckets that are associated respectively therewith.

Nevertheless, the height position(s) of the bucket(s) and the angle of inclination of the back relative to the seat of a given bucket may also potentially be adjusted by an operator in a workshop and/or while the bench is being installed on the floor of the aircraft, in particular when the bench has a single framework carrying one or more buckets. Under such circumstances, such provisions seek to simplify organizing the first means and the second means.

The first and second means may advantageously be installed in the hinge zones of the framework and/or the zones of engagement between the framework and the energy absorber means.

For example, concerning the first means:

when the energy absorber means work in traction, the first means are arranged in particular in the zones where the energy absorber means engage with the top bar and/or with the bottom transverse-member; and when the energy absorber means work in compression, the first means are arranged in particular in the zones where the energy absorber means engage with the bottom bar and/or with the top transverse-member.

Still by way of example, and concerning the second means:

when the energy absorber means work in traction, the second means are arranged in particular in the hinge zones between the top transverse-member and the top bar and/or the upright-member; and when the energy absorber means work in compression, the second means are arranged in particular in the zones where the bottom transverse-member is hinged with the bottom bar and/or with the extension of the upright-member.

By way of example, the first means and/or the second means may make use of manually operable locking means, such as means of the type making use of a pin, of the type using co-operation between a nut and a bolt, or indeed such as means of the type formed by a rack mechanism or by a ball latch.

Also by way of example, the first and/or second locking means may make use of operator-actuated power assistance means such as a mechanism for operating a latch with a hydraulic actuator or an electric actuator, or such as a controlled-operation cam mechanism.

In simple embodiments, the first and/or second means are formed by slideways, e.g. arranged as oblong slots.

For the first means, a said slideway may be arranged in particular at least at either one of the ends of said at least one energy absorber means, preferably at its front end, where it is in hinged engagement either with the top bar or with the bottom bar, depending on whether they work in traction or in compression.

Concerning the second means, and depending on the way in which said energy absorber means work, a said slideway may be arranged in particular at at least one of the ends either of the top transverse-member or of the bottom transverse-member, and preferably at a front end for hinged engagement respectively with the top bar or with the bottom bar, as the case may be.

In other simple embodiments, the first and second locking means are formed by mechanisms for blocking at respective desired positions along the bars respectively (for the first locking means) the energy absorber means and/or (for the second locking means) the top or bottom transverse-member, depending on whether the energy absorber means work in compression or in traction. By way of example, each of such locking means may comprise a lever with an eccentric that is manually operable by the passenger(s).

Furthermore, the architecture of the bench advantageously enables it to be arranged easily to provide the bench with an additional function.

Such an additional function lies in using the bench to form a platform that can be used for receiving various pieces of equipment and more specifically a stretcher, for example.

More particularly, for this purpose, the framework is provided with third means dedicated to folding the upright-member down towards the top transverse-member by separating the junction between the upright-member and the support structure as provided via the bottom transverse-member, and then by blocking by using third locking means for locking the upright-member in its position folded down towards the top transverse-member.

When the energy absorber means work in traction, being interposed between the top bar and the bottom transverse-member, said third means are in particular means for separating the hinged connection between the bottom transverse-member and the extension of the upright-member. When the energy absorber means work in compression being interposed between the bottom bar and the top transverse-member, and said third means are potentially constituted equally well by means for separating the hinged connection between the bottom transverse-member and the extension of the upright-member, and/or may be means for separating the hinged connection between the bottom transverse-member and the bottom bar.

It should be observed that completely removing the bottom transverse-member is then permissible, and may be useful to avoid impeding the bench when the upright-member is placed in its position folded down towards the top transverse-member.

Furthermore, the architecture of the bench enables it to be arranged easily to release the space behind a front bench so as to facilitate user access to a rear bench adjacent to the front bench. These provisions serve in particular to enable said adjacent benches to be installed close together.

More particularly, for this purpose, the framework is provided with fourth means dedicated to tilting the framework towards the front of the bench so as to release space behind the support structure. For this purpose, for a given framework, it is preferable to make use of one or more energy absorber means that work in traction and that are interposed between the top bar and said at least one bottom transverse-member.

In an embodiment, said fourth means are means for separating the hinged connection between the top transverse-member and the top bar allowing the framework to pivot forwards about the hinge between the bottom transverse-member and the bottom bar.

In another embodiment, said fourth means are means for separating the hinged connection between the bottom transverse-member and the bottom bar allowing the framework to pivot forwards about the hinge between the top transverse-member and the top bar.

In a preferred embodiment, the bucket is provided with lining including at the front zone of the seat a pouch of air provided with a valve. Said valve is suitable for being broken by the support structure as a result of the framework pivoting on the support structure as a result of said deformation of the energy absorber means.

Such provisions serve to facilitate evacuating passengers from the bench in the event of the aircraft crashing. It should be observed that the location of the air pouch in the front zone of the seat makes it possible to install in the rear zone of the seat a cushion of the lining for limiting the lumbar load on the passenger in the event of the aircraft crashing and/or being subjected to a high level of deceleration.

BRIEF DESCRIPTION OF THE SEVERAL VIEWS OF THE DRAWINGS

Embodiments of the present invention are described with reference to the figures of the accompanying sheets, in which.

DETAILED DESCRIPTION OF THE INVENTION

Members and/or elements shown in common in the various figures are designated in the description by common names and are identified by the same reference numbers and/or letters.

In FIGS. 1 to 16, an aircraft bench comprises a support structure 1 and one or more frameworks 2 for mounting one or more buckets 3 on the support structure 1. In order to protect passengers in the event of the aircraft crashing and/or being subjected to high levels of deceleration, the bench is fitted with one or more energy absorber means 4 interposed between the support structure 1 and each of the frameworks 2.

Figure 1:
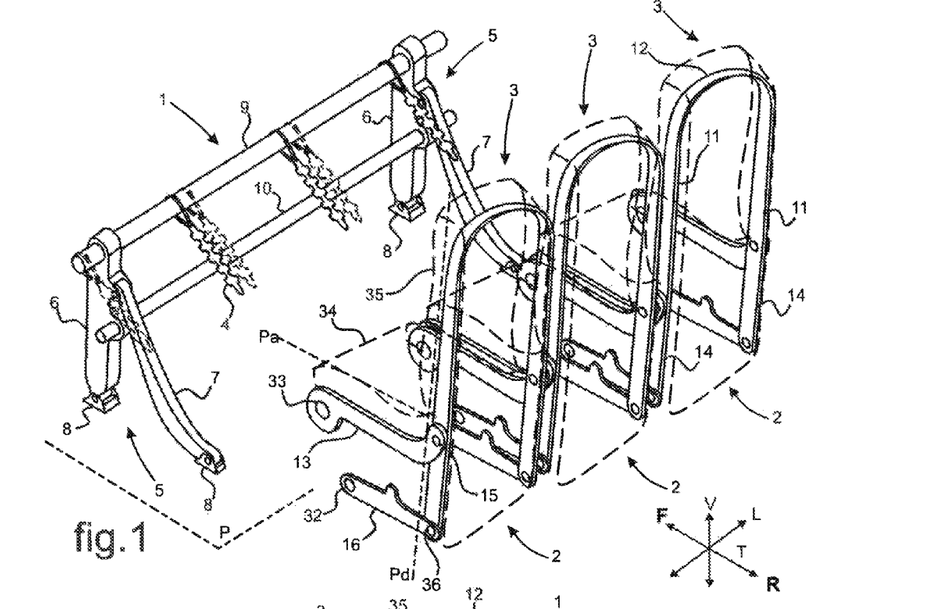
FIGS. 1 and 2 are perspective views of an embodiment of an aircraft bench in accordance with the present invention, said bench being shown in an exploded view in FIG. 1 and an assembled view in FIG. 2.
Figure 2:
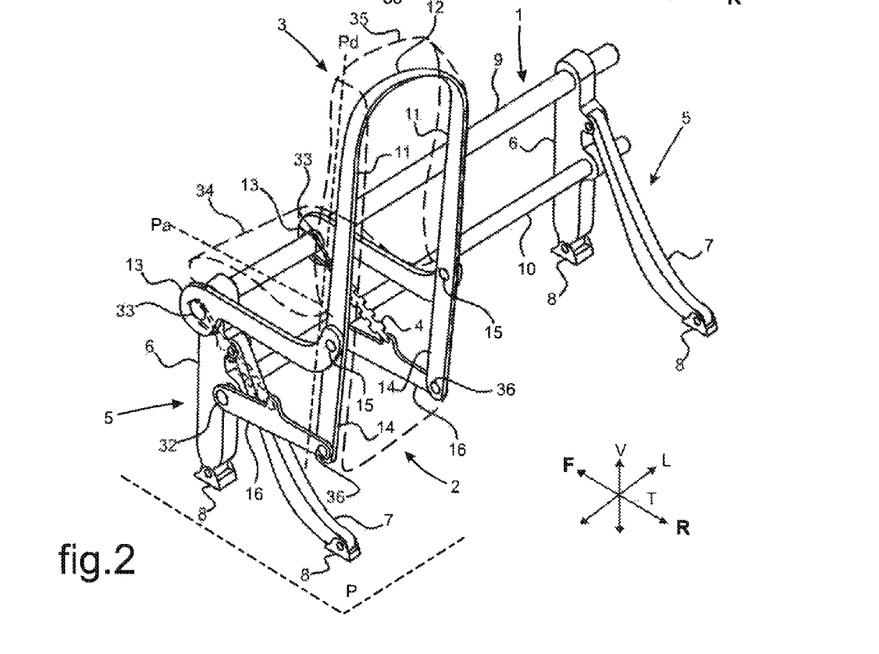

In the embodiment shown in FIGS. 1 and 2, the bench has a plurality of frameworks 2, each carrying a respective bucket 3.

Nevertheless, it should be understood that the bench could be provided with at least one framework 2 carrying a plurality of buckets 3 jointly. It should also be understood that the organization of the bench is applicable to a single-person seat, in which case the bench would have a single framework 2 carrying a single bucket 3.

Furthermore, in order to make FIG. 2 easier to observe, only one framework 2 is shown from the set of frameworks 2 shown in FIG. 1.

In FIGS. 1 to 16, the support structure 1 has two anchor members 5 arranged as transversely-extending underframes (of transverse orientation T), being located at the longitudinal ends of the bench.

When the bench has a longitudinal extent of considerable size (longitudinal orientation L), intermediate underframes may be placed between the longitudinal ends of the bench in order to strengthen its attachment to the floor of the aircraft.

It should be observed that in order to reduce the weight of the bench to as small a weight as possible, at least one of the anchor members 5 arranged as an underframe may be replaced by anchor members formed by means for fastening the support structure 1 to a structural wall of the aircraft fuselage.

Each anchor member 5 arranged as an underframe, identified by an underframe referenced 5, comprises a front leg 6 and a rear leg 7, the rear leg 7 extending rearwards from the front of the bench (front direction F; rear direction R), curving towards the base of the bench. The front leg 6 and the rear leg 7 of each underframe 5 are provided with respective fittings 8 for fastening the bench to the floor of the aircraft.

It should be understood that in general terms each underframe 5 is provided with first fastener means potentially formed by said fitting 8 or by a fastener member of simpler structure, e.g. arranged as a bolt.

Between them, the fittings 8 define an installation plane P for the bench when it is in use. In a conventional embodiment, such fittings 8 are of known type co-operating with rails fitted to the floor of the aircraft.

The underframes 5 jointly carry a pair of longitudinally-extending bars 9, 10 placed at the front of the bench and being arranged spaced apart substantially in superposition in the vertically-extending direction of the bench (vertical orientation V). The bars comprise a top bar 9 and a bottom bar 10 together defining a front plane of the support structure 1 extending substantially orthogonally relative to the installation plane P.

The bars 9, 10 are mounted on the underframes 5 by passing through sockets or by means of clamping collars, for example, such that the longitudinal spacing between the underframes 5 can be adapted depending on the spacing between the rails fitted to the floor. Where necessary, the bars 9 and 10 may be braced to each other in order to increase their ability to withstand bending.

Each of the frameworks 2 comprises a pair of upright-members 11 interconnected at the top by a top-piece 12 (visible in FIGS. 1 and 2), the assembly constituted by a pair of upright-members 11 and a top-piece 12 being arranged as an arch. A top transverse-member 13 is hinge-mounted to each of the upright-members 11 and to the top longitudinally-extending bar 9.

For each of the frameworks 2, the upright-members 11 and the top transverse-members 13 together carry a bucket 3 including a seat 34 and a back 35 lying respectively in a seat frame Pa defined by the top transverse-members 13 and a back plane Pd defined by the upright-members 11.

The upright-members 11 of each of the frameworks 2 have respective extensions 14 extending towards the base of the bench under the seat plane Pa from the hinges 15 where the top transverse-members 13 are connected to the upright-members 11. The extensions 14 and the upright-members 11 are integral with each other and for each upright-member 11 they form a rigid member.

A bottom transverse-member 16 is engaged with each of the upright-members 11 via a hinge 36 and with the bottom longitudinally-extending bar 10 via a hinge 32.

For each of the frameworks 2, at least one energy absorber means 4 is interposed between the support structure 1 and the framework 2. A given framework 2 may potentially be fitted with only one or with a plurality of energy absorber means 4.

The framework(s) 2 is/are carried individually by being suspended from the support structure 1 via the bars 9 and 10, while being individually held by the energy absorber means 4 against tilting individually downwards at the rear of the bench.

In the embodiments shown in FIGS. 1 to 13, the energy absorber means work in traction, being securely attached to the top bar 9 and any one of the bottom transverse-members 16 of a given framework 2.

When a given framework 2 is fitted with a plurality of energy absorber means 4 working in traction, at least two of the energy absorber means 4 are engaged securely with respective bottom transverse-members 16 that are allocated thereto.

Such energy absorber means 4 working in fraction are preferably each in the form of a block of plastically deformable material having a modulus of elasticity and a shape that causes it to be stretched when subjected to a traction force greater than a predetermined force threshold. In a variant, such energy absorber means 4 working in traction may potentially be arranged as piston and cylinder unit.

Figure 14:
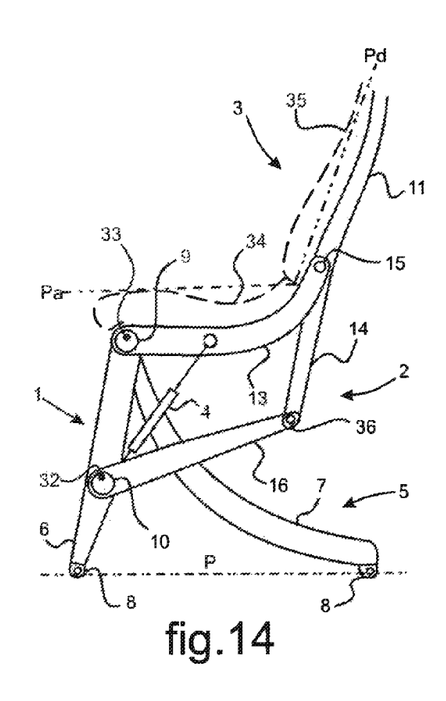
FIGS. 14 and 15 are profile views of another embodiment of an aircraft bench in accordance with the present invention, said bench being shown in a situation of ordinary use in FIG. 14 and in a situation of the aircraft crashing and/or being subjected to high deceleration in FIG. 15.
Figure 15:
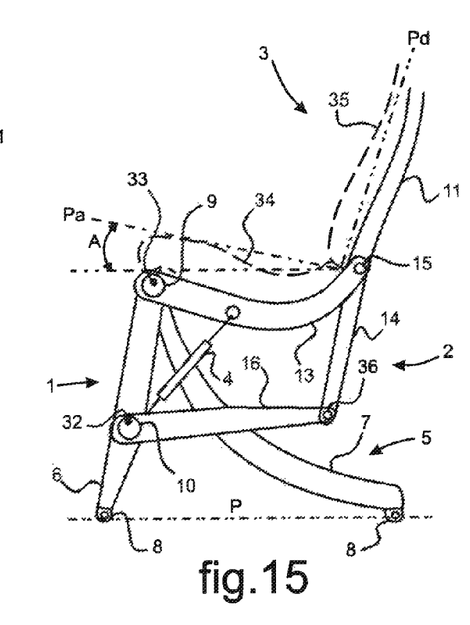
Figure 16:
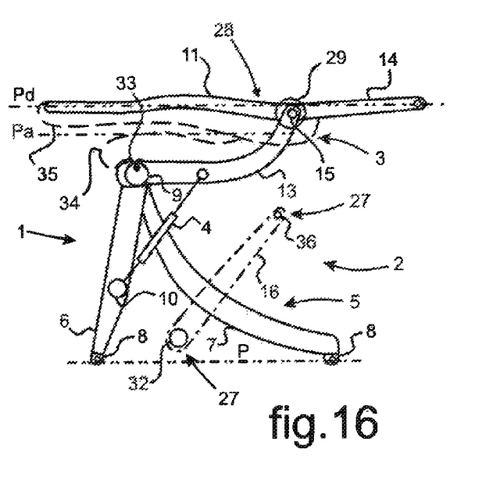
FIG. 16 is a profile view of a particular arrangement of the aircraft bench shown in FIGS. 14 and 15.

In the embodiment shown in FIGS. 14 to 16, the energy absorber means operate in compression, being engaged securely with the bottom bar 10 and with either one of the top transverse-members 13 of a given framework 2.

When a single framework 2 has a plurality of energy absorber means 4 working in compression, two energy absorber means 4 are engaged securely with respective ones of the top transverse-members 13 that are respectively associated therewith. Such energy absorber means 4 working in compression are conventionally organized as piston and cylinder units.

In FIGS. 2, 3, 5 to 9, and 11, and also in FIG. 14, the bench is shown in a situation for ordinary use, i.e. configured to enable at least one user to sit on the bench and in the absence of any exceptional situation in which the aircraft is being subjected to high levels of deceleration and/or is in a crash situation.

Figure 4:
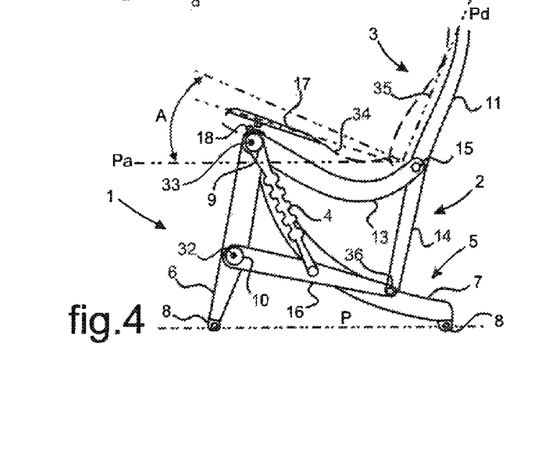

In FIG. 4 and also in FIG. 15, for a given framework 2, a situation of the aircraft crashing or being subjected to a high level of deceleration leads to the passenger(s) applying a load on the bench 3 causing the energy absorber means 4 to deform and allowing the framework 2 to tilt downwards at the rear so as to protect the passenger(s). It can be seen that of itself, such tilting of the framework 2 serves to reduce the load(s) to which the lumbar region(s) of the passenger(s) is/are subjected.

More particularly, for a given framework 2, the support structure 1 under consideration between the bars 9 and 10 in a transverse plane, the top transverse-member 13, the extension 14 of the upright-member 11, and the bottom transverse-member 16 form the sides of a deformable quadrilateral that are hinged together in pairs.

Deformation of the energy absorber means 4 leads to deformation of the deformable quadrilateral by relative pivoting between its sides. Such deformation of the deformable quadrilateral allows the framework to tilt downwards at the rear of the bench through an angular stroke A that is limited to a stroke of about 35°.

It can be seen that said deformable quadrilateral is preferably a deformable parallelogram in order to protect the passenger by the framework 2 tilting downwards and at the rear of the bench while avoiding any change in the angle of the back 35 relative to the installation plane P of the bench, with this applying in spite of the hinged connection between the seat 34 and the back 35 in a given bucket 3.

In FIG. 4, the deformation of the energy absorber means 4 is deformation in elongation, whereas in FIG. 15, said deformation of the energy absorber means 4 is deformation in contraction.

It can be seen that in accordance with the architecture of the bench proposed by the invention, it does not matter whether the energy absorber means 4 are selected to work in traction or in compression in terms of obtaining the desired deformation of the deformable quadrilateral, and consequently obtaining the desired tilting of the framework 2 in a situation in which the aircraft is crashing and/or being subjected to a high level of deceleration.

Such an architecture for the bench makes it possible to release the space behind the bench so as to allow two adjacent benches to be installed one close in front of the other without hindering the passengers.

Furthermore, the curved shape of the rear legs 7 releases space for passing the seat while the framework 2 is tilting. Such provisions also serve to limit the forces transmitted to the front of the support structure under the effect of the framework 2 tilting in order to limit the forces that the bolts 8 need to withstand.

It should also be observed that the architecture for the bench makes it possible to restrict loading of the underframe 5 towards the bottom of the bench while the framework 2 is tilting, so as to avoid the underframes 5 making any contribution to energy absorption, which is to be obtained solely by the energy absorber means 4.

In addition, by having the framework 2 supported in suspension so that it can tilt relative to the front of the support structure 1 by means of the longitudinally-extending bars 9 and 10, and by having the framework 2 arranged as a deformable quadrilateral, enables the framework 2 and thus the passengers to be protected as well as possible against deformation of the floor of the aircraft in the event of a crash.

Figure 3:
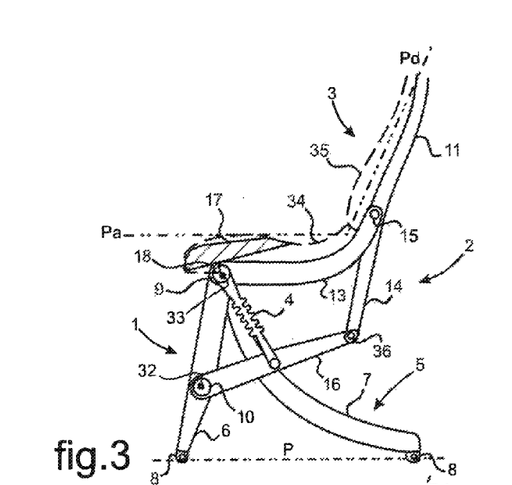
FIGS. 3 and 4 are profile views of another embodiment of an aircraft bench in accordance with the present invention, said bench being shown in a situation of ordinary use in FIG. 3 and in a situation of the aircraft crashing and/or being subjected to high deceleration in FIG. 4.

In FIGS. 3 and 4, lining of the buckets 3 incorporates a pouch of air 17 arranged at the front of the seat 34.

Where necessary, and depending on the arrangement of the bench, such a pouch of air 17 serves to optimize the angle of inclination A of the seat plane Pa relative to the installation plane P in the event of the framework 2 tilting under the effect of deformation of the energy absorber means 4.

For this purpose, the pouch of air 17 is provided with a valve 18 placed in abutment against the support structure 1 when the bench is in its ordinary use situation, as shown in FIG. 3. The valve 18 is brought into abutment against the support structure, e.g. via the top longitudinally-extending bar 9. The valve 18 is placed on the path traveled by the framework 2 while it is tilting downwards and at the rear of the bench as made possible by deformation of the energy absorber means 4, as shown in FIG. 4.

Tilting of the framework 2 downwards and at the rear of the bench causes the valve 18 to be broken by the support structure 1 and consequently allows the air contained in the pouch of air 17 to be discharged under the effect of the mass of the passenger.

Emptying the pouch of air 17 causes the seat 34 to flatten and modifies the general angle of orientation of the seat plane Pa. By way of indication, such flattening of the seat 34 may produce a saving of 15° in the angle of inclination A of the seat plane Pa relative to the installation plane P. It should be observed that the above-mentioned provisions relating to incorporating a pouch of air 17 in the lining of the bucket 3 may be transposed to the situation of a bench in compliance with the embodiment shown in FIGS. 14 to 16.

Figures 17, 18:
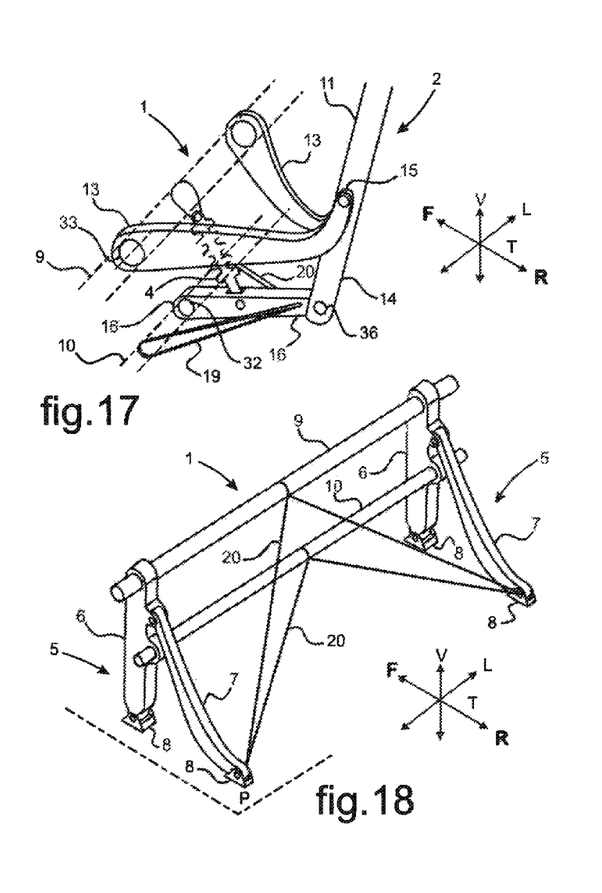
FIG. 17 is a perspective view of another embodiment of a framework for an aircraft bench in accordance with the present invention.
FIG. 18 is a perspective view of another particular embodiment of a support structure for an aircraft bench in accordance with the present invention.

In the embodiment shown in FIG. 17, a framework 2 of an aircraft bench in accordance with the invention co-operates with a support structure 1 that is not shown and that is as described above with reference to FIGS. 1 to 16.

In this variant embodiment of the bench, the framework 2 has a single upright-member 11 to which both of the two top transverse-members 13 are jointly hinged. The top transverse-members 13 are hinged to the top longitudinally-extending bar 9 in positions that are longitudinally spaced apart.

A single bottom transverse-member 16 is hinged to the upright-member 11 and to the bottom bar 10. The framework 2 is fitted with single energy absorber means 4 working in traction placed in secure engagement with the bottom transverse-member 16 and the top bar 9.

It can be seen that a framework 2 of the kind shown in the embodiment of FIG. 17 may be fitted with at least one energy absorber means 4 that works in compression as a replacement for the energy absorber means 4 working in traction as shown. Under such circumstances, the said at least one energy absorber means 4 working in compression should be interposed between the bottom longitudinally-extending bar 10 and either one of the top transverse-members 13 with which the energy absorber means 4 working in compression is associated, as described above with reference to FIGS. 14 to 16.

The bottom transverse-member 16 is fitted with first ties 19 for taking up the forces to which it is subjected. Such first ties 19 are arranged as cords and they are securely engaged with the bottom transverse-member 16 and with the bottom longitudinally-extending bar 10 with the first ties 19 being anchored thereto in positions that are longitudinally spaced apart.

In the embodiment shown in FIG. 18, a support structure 1 of the kind described above with reference to FIGS. 1 to 13 is fitted with second ties 20 arranged as cables for taking up the forces to which the support structure 1 is subjected. Said second ties 20 connect each of the longitudinally-extending bars 9 and 10 together with the bases of the rear legs 7 of each of the underframes 5, e.g. by means of the fittings 8.

Naturally, the path followed by the second ties 20 is shown by way of example and it is adapted depending on the arrangement of the bench so as to avoid constituting an obstacle to the framework 2 tilting downwards and at the rear of the bench in the event of the aircraft crashing or being subjected to a high level of deceleration.

Figure 5:
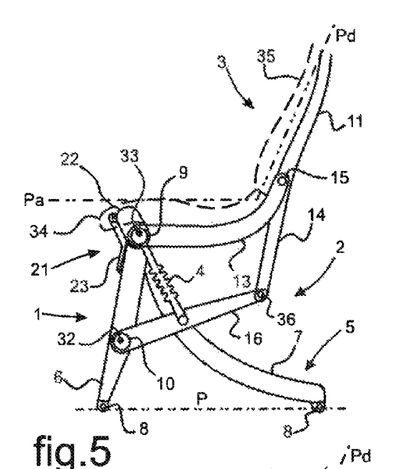
FIGS. 5 and 6 are profile views of a particular arrangement of an aircraft bench in accordance with the present invention in respective positions in a situation of ordinary use.
Figure 6:
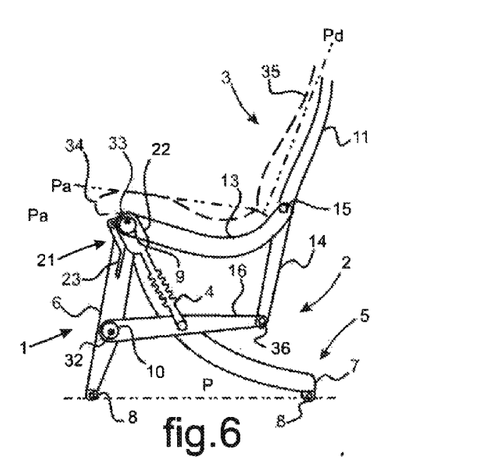

In FIGS. 5 and 6, the framework 2 is fitted with first means 21 dedicated to adjusting the height position of the bucket 3, by modifying the angle formed between the seat plane Pa and the installation plane P. To this end, the first means are means for adjusting the extent to which the energy absorber means 4 extend, naturally as considered in an ordinary use situation of the bench.

More particularly, and in the embodiment shown as an example, the energy absorber means 4 are mounted on the top longitudinally-extending bar 9 via an oblong slot 22 for varying the extent to which the energy absorber means 4 extend between the top bar 9 and the bottom transverse-member 16.

First locking means 23, e.g. arranged as a lever with an eccentric in the embodiment shown, serve to block the energy absorber means 4 in a desired position relative to the top bar 9.

It may be observed that in the embodiment of the bench shown in FIGS. 14 to 16, such first means may be formed by means analogous to those described with reference to FIGS. 5 and 6 for adjusting the extent to which the energy absorber means 4 extend, but arranged between the bottom longitudinally-extending bar 10 and the top transverse-member 13.

Figures 7, 8, 9, 10:
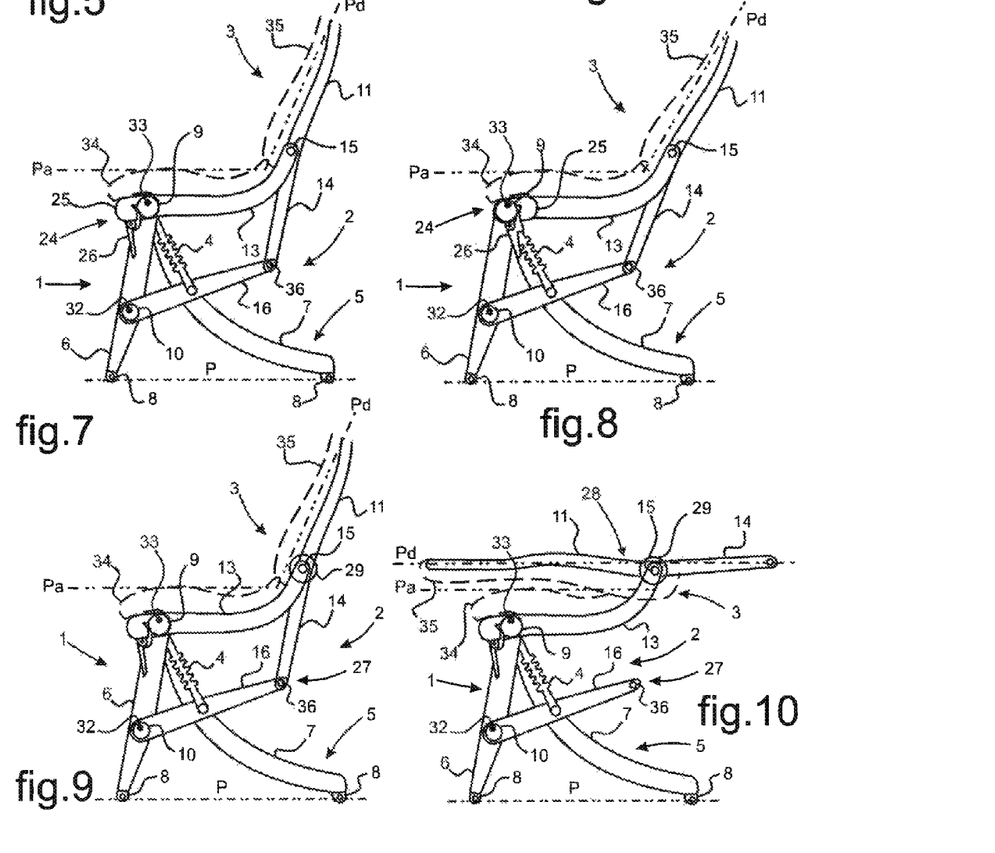
FIGS. 7 and 8 are profile views of another particular arrangement of an aircraft bench in accordance with the present invention in respective positions in a situation of ordinary use.
FIGS. 9 and 10 are profile views of another particular arrangement of an aircraft bench in accordance with the present invention shown respectively in a position for a situation of ordinary use in FIG. 9 and in a situation for forming a platform in FIG. 10.

In FIGS. 7 and 8, the framework 2 has second means 24 dedicated to adjusting the dihedral angle formed between the seat plane Pa and the back plane Pd.

This adjustment is performed by relative pivoting between the upright-member 11 and the top transverse-member 13 about the hinge 15 connecting them together. For this purpose, the second means are:

either means for adjusting the extent to which the top transverse-member 13 extends when using energy absorber means 4 working in traction, as shown in FIGS. 1 to 10;

or else means for adjusting the extent to which the bottom transverse-member 16 extends when using energy absorber means 4 working in compression, as shown in FIGS. 14 to 16.

By way of example, in FIGS. 7 and 8, the top transverse-member 13 is mounted on the top longitudinally-extending bar 9 via an oblong slot 25 enabling the extent to which the top transverse-member 13 extends between the top bar 9 and the upright-member 11 to be varied. Second locking means 26, such as means arranged as a lever with an eccentric in the embodiment shown as an example, enable the top transverse-member 13 to be blocked in a desired position relative to the top bar 9.

In FIGS. 9 and 10, and also in FIG. 16, the framework 2 is fitted with third means 27 for folding down the upright-member 11 towards the top transverse-member 13. Such provisions enable a platform 28 to be provided for installing a stretcher or to form a work surface by using the back 35 placed in a position where it is substantially parallel to the installation plane P.

For this purpose, the third means 27 are means enabling an operator to reversibly separate the junction between the extension 14 of the upright-member 11 and the support structure 1 via the bottom transverse-member 16.

The framework 2 is fitted with third locking means 29 for locking the back 35 in its position folded down towards the seat 34 in order to block the back 35 in its position folded down against the seat 34, e.g. using a clamping flange mounted on the hinge 15 between the top transverse-member 13 and the upright-member 11.

In the embodiment shown in FIG. 10, where the energy absorber means 4 work in traction, the third means 27 are means for separating the junction between the bottom transverse-member 16 and the extension 14 of the upright-member 11 as provided by the hinge 36 between them.

In the embodiment shown in FIG. 16, where the energy absorber means 4 work in compression, the third means 27 are means for separating the junction between the bottom transverse-member 16 and the extension 14 of the upright-member and/or for separating the junction between the bottom transverse-member 16 and the bottom longitudinally-extending bar 10.

It may be observed that in this embodiment, the bottom transverse-member 16 may be completely withdrawn from the bench when the upright-member 11 is in its position folded down onto the seat 34 in order to avoid obstructing the bench.

Figure 11:
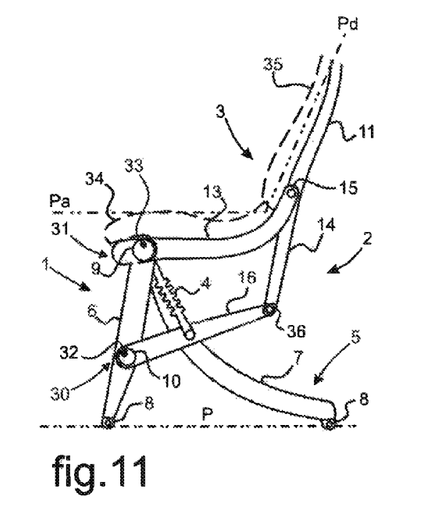
FIGS. 11, 12, and 13 are profile views of another particular arrangement of an aircraft bench in accordance with the present invention, enabling the space behind the bench to be released in order to make it easier for passengers to pass between two neighboring benches installed one close in front of the other.
Figure 12:
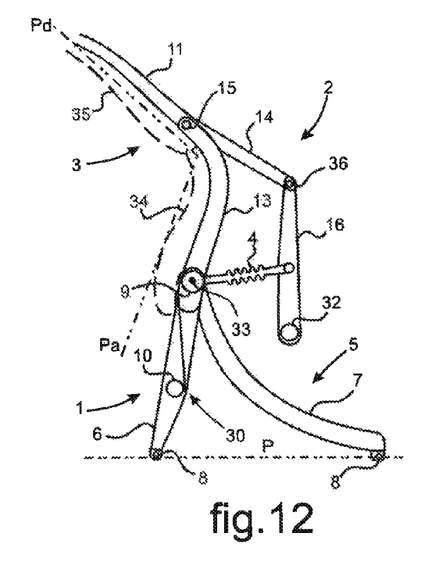
Figure 13:
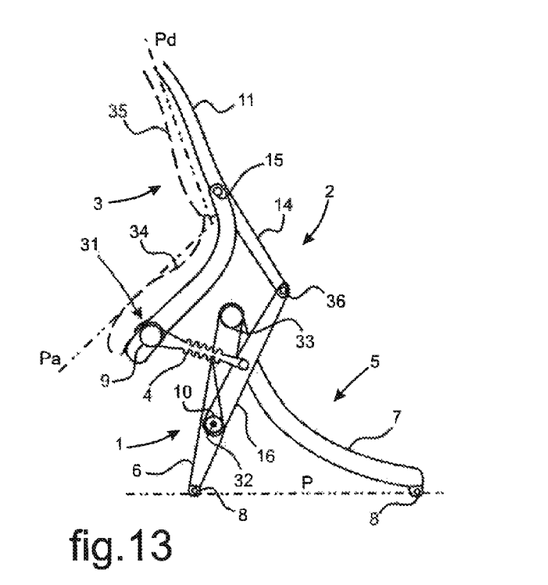

In FIGS. 11 to 13, the framework 2 is fitted with fourth means 30, 31 for tilting the framework 2 towards the front of the bench, so as to release the space behind the bench in order to make it easier for passengers to move.

To this end, in the embodiment shown in FIG. 12, the fourth means are first means 30 for enabling an operator to reversibly separate the hinged connection 32 between the bottom transverse-member 16 and the bottom longitudinally-extending bar 10 so as to allow the framework 2 to pivot towards the front of the bench about the hinge 33 between the top transverse-member 13 and the top longitudinally-extending bar 9.

Still for this purpose, and in the embodiment shown in FIG. 13, the fourth means are second means 31 for enabling an operator to separate reversibly the hinged connection 33 between the top transverse-member 16 and the top longitudinally-extending bar 9 so as to allow the framework 2 to pivot towards the front of the bench about the hinge 32 between the bottom transverse-member 16 and the bottom longitudinally-extending bar 10.

What is claimed is:

1. An aircraft bench having a support structure with at least one framework hinged thereto for mounting at least one bucket, the at least one bucket comprising a seat with a back extending upwards therefrom and respectively defining a seat plane and a back plane forming a dihedral angle relative to each other, the bench having a rear and a bottom and being fitted with at least one energy absorber means that is deformable under as a result of the bench being subjected to forces that are greater than a predefined force threshold;

the support structure comprising longitudinally-extending bars and being provided with anchor members suitable for fastening the bench in position for use on board the aircraft on an installation plane extending substantially parallel to the seat plane; and the framework comprising at least one upright-member for holding the back and at least one top transverse-member for holding the seat, the top transverse-member being engaged with the upright-member and being hinged to the support structure via one of the longitudinally-extending bars that extends in a high portion at a front of the support structure, and that is referred to as the "top" bar;

wherein:

another one of the longitudinally-extending bars of the support structure, referred to as a "bottom" bar, extends in a low portion at a front of the support structure below the seat plane, the bottom bar and the top bar being spaced apart substantially in vertical superposition;

the at least one upright-member includes an extension extending towards a base of the support structure below the seat plane from a hinged connection between the top transverse-member and the upright-member;

the framework includes at least one bottom transverse-member extending under the seat plane and being hinged to pivot firstly relative to the extension of the upright-member and secondly to the support structure via the bottom bar so that the assembly formed in a transverse plane by the top transverse-member, the extension of the upright-member, the bottom transverse-member, and the support structure as considered between the bars, is arranged as a deformable quadrilateral; and the at least one energy absorber means being interposed via secure engagements with the support structure and the framework, so as to retain the framework against tilting downwards and at the rear of the bench, with deformation of the energy absorber means allowing the deformable quadrilateral to deform so as to cause the framework to tilt and consequently to cause the bucket to tilt downwards and at the rear of the bench, by the top transverse-member and the bottom transverse-member pivoting relative to the support structure and to the upright-member.

2. The aircraft bench according to claim 1, wherein the at least one energy absorber means works in traction, with the at least one energy absorber means being interposed between the top bar and the bottom transverse-member, retaining the framework in suspension via the bottom transverse-member.

3. The aircraft bench according to claim 1, wherein the at least one energy absorber means works in compression, and with the at least one energy absorber means being interposed between the bottom bar and the top transverse-member, retaining the framework by supporting it via the top transverse-member.

4. The aircraft bench according to claim 1, wherein the bench is fitted with a plurality of frameworks that are arranged longitudinally side by side and that are individually supported in suspension by the support structure, the at least one energy absorber means comprising a plurality of energy absorber means and each of the plurality of frameworks carrying an individual bucket and each being retained against individually tilting by a respective one of the plurality of the energy absorber means allocated thereto.

5. The aircraft bench according to claim 1, wherein the at least one framework comprises:
at least two upright-members securely connected to each other by at least one longitudinally-extending top-piece;
at least two top transverse-members jointly hinged on the top bar and individually engaging respective upright-members; and
at least two bottom transverse-members jointly hinged to the bottom bar and individually hinged to the bases of the extensions of respective upright-members.

6. The aircraft bench according to claim 5, wherein the at least one energy absorbing means comprises one energy absorbing means and the at least one framework is fitted with the energy absorber means.

7. The aircraft bench according to claim 5, wherein the at least one energy absorbing means comprises at least two energy absorbing means and the at least one framework is fitted with the at least two energy absorber means.

8. The aircraft bench according to claim 1, wherein the at least one framework comprises:
the upright-member engaged with at least two the top transverse-members having respective hinges with the top bar that are longitudinally spaced apart from each other; and
the bottom transverse-member having first ties for taking up the forces to which it is subjected, the first ties connecting together the bottom transverse-member and the bottom bar to which bottom bar the first ties are each engaged at positions that are longitudinally spaced apart.

9. The aircraft bench according to claim 1, wherein the anchor members comprise at least two underframes extending transversely and longitudinally connected together by the longitudinally-extending bars, each underframe having at least one front leg and at least one rear leg, each leg being fitted at its base with fastener means for fastening the bench in its in-use position.

10. The aircraft bench according to claim 9, wherein for each of the underframes, the rear leg is fastened to a high end of the front leg and extends transversely between the front leg and the rear of the bench following a curve towards the bottom of the bench with the concave side of the curve facing towards the top of the bench in the in-use position.

11. The aircraft bench according to claim 9, wherein the support structure is fitted with second ties for taking up the forces to which it is subjected, the second ties connecting together each of the longitudinally-extending bars and bases of the rear legs of each of the underframes.

12. The aircraft bench according to claim 1, wherein the framework is provided with first means dedicated to adjusting the angle formed between the seat plane and the installation plane so as to adjust the height of the bucket, firstly by pivoting the framework about the hinge between the top transverse-member and the top bar and secondly by preventing the pivoting of the framework by first locking means when the framework is at a desired angle of inclination relative to the installation plane.

13. The aircraft bench according to claim 12, wherein the first MEANS are for adjusting the extent to which the energy absorber means extend.

14. The aircraft bench according to claim 1, wherein the framework is provided with second means dedicated to adjusting the dihedral angle formed between the seat plane and the back plane by relative pivoting between the upright-member and the top transverse-member, and then by blocking the relative pivoting by second locking means when the seat and the back are at a desired mutual orientation.

15. The aircraft bench according to claim 14, wherein the at least one energy absorber means is interposed between the top bar and the bottom transverse-member, and the second means are for adjusting the extent to which the top transverse-member extends between the top bar and the upright-member.

16. The aircraft bench according to claim 14, wherein the at least one energy absorber means is interposed between the bottom bar and the top transverse-member, and the second means are for adjusting the extent to which the bottom transverse-member extends between the bottom bar and the extension of the upright-member.

17. The aircraft bench according to claim 1, wherein the framework is provided with third means dedicated to folding the upright-member down towards the top transverse-member by separating the junction between the upright-member and the support structure as provided via the bottom transverse-member, and then by blocking by using third locking means for locking the upright-member in its position folded down towards the top transverse-member.

18. The aircraft bench according to claim 17, wherein the energy absorber means works in traction, being interposed between the top bar and the bottom transverse-member, and the third means are for separating the hinged connection between the bottom transverse-member and the extension of the upright-member.

19. The aircraft bench according to claim 17, wherein the energy absorber means works in compression being interposed between the bottom bar and the top transverse-member, and the third means are for separating the hinged connection between the bottom transverse-member and the extension of the upright-member, and/or for separating the hinged connection between the bottom transverse-member and the bottom bar.

20. The aircraft bench according to claim 1, wherein the framework is provided with fourth means dedicated to tilting the framework towards the front of the bench so as to release space behind the support structure.

21. The aircraft bench according to claim 20, wherein the at least one energy absorber means is interposed between the top bar and the at least one bottom transverse-member, and the fourth means are for separating the hinged connection between the top transverse-member and the top bar allowing the framework to pivot forwards about the hinge been the bottom transverse-member and the bottom bar.

22. The aircraft bench according to claim 20, wherein the at least one energy absorber means is interposed between the top bar and the at least one bottom transverse-member, and the fourth means are for separating the hinged connection between the bottom transverse-member and the bottom bar allowing the framework to pivot forwards about the hinge between the top transverse-member and the top bar.

23. The aircraft bench according to claim 1, wherein the bucket is provided with lining including at the front zone of the seat a pouch of air provided with a valve for being broken by the support structure as a result of the framework pivoting on the support structure as a result of the deformation of the energy absorber means.

\* \* \* \* \*